United States Patent [19]

Youngdale

[11] 4,319,768
[45] Mar. 16, 1982

[54] VEHICLE SUSPENSION STRUT

[75] Inventor: Ralph A. Youngdale, Union Lake, Mich.

[73] Assignee: Chrysler Corporation, Highland Park, Mich.

[21] Appl. No.: 137,051

[22] Filed: Apr. 3, 1980

[51] Int. Cl.³ .............................................. B60G 15/02
[52] U.S. Cl. ....................................... 280/668; 308/26
[58] Field of Search ........................... 280/668; 308/26

[56] References Cited

U.S. PATENT DOCUMENTS

| | | | |
|---|---|---|---|
| 2,557,835 | 6/1951 | Monahan | 308/26 |
| 3,171,699 | 3/1965 | Maxey | 308/26 |
| 3,215,477 | 11/1965 | Arthur | 308/26 |
| 3,279,782 | 10/1966 | Schick | 280/668 |
| 3,353,879 | 11/1967 | Jorn | 308/26 |
| 3,424,503 | 1/1969 | Schulz | 308/26 |
| 3,490,785 | 1/1970 | Moss | 280/668 |
| 4,175,770 | 11/1979 | Draisbach et al. | 280/668 |
| 4,200,307 | 4/1980 | Szabo | 280/668 |

Primary Examiner—Joseph F. Peters, Jr.
Assistant Examiner—Ross Weaver
Attorney, Agent, or Firm—Newtson & Dundas

[57] ABSTRACT

A vehicle suspension strut is provided with an improved bearing assembly consisting of a metallic bearing member which directly supports a portion of the rod member of the strut and a plastic seal member which sealingly engages the bearing member and provides for securely resiliently mounting the bearing assembly in a self centering manner in the structure by which the strut is fixed to the body of the vehicle.

5 Claims, 3 Drawing Figures

U.S. Patent   Mar. 16, 1982   4,319,768
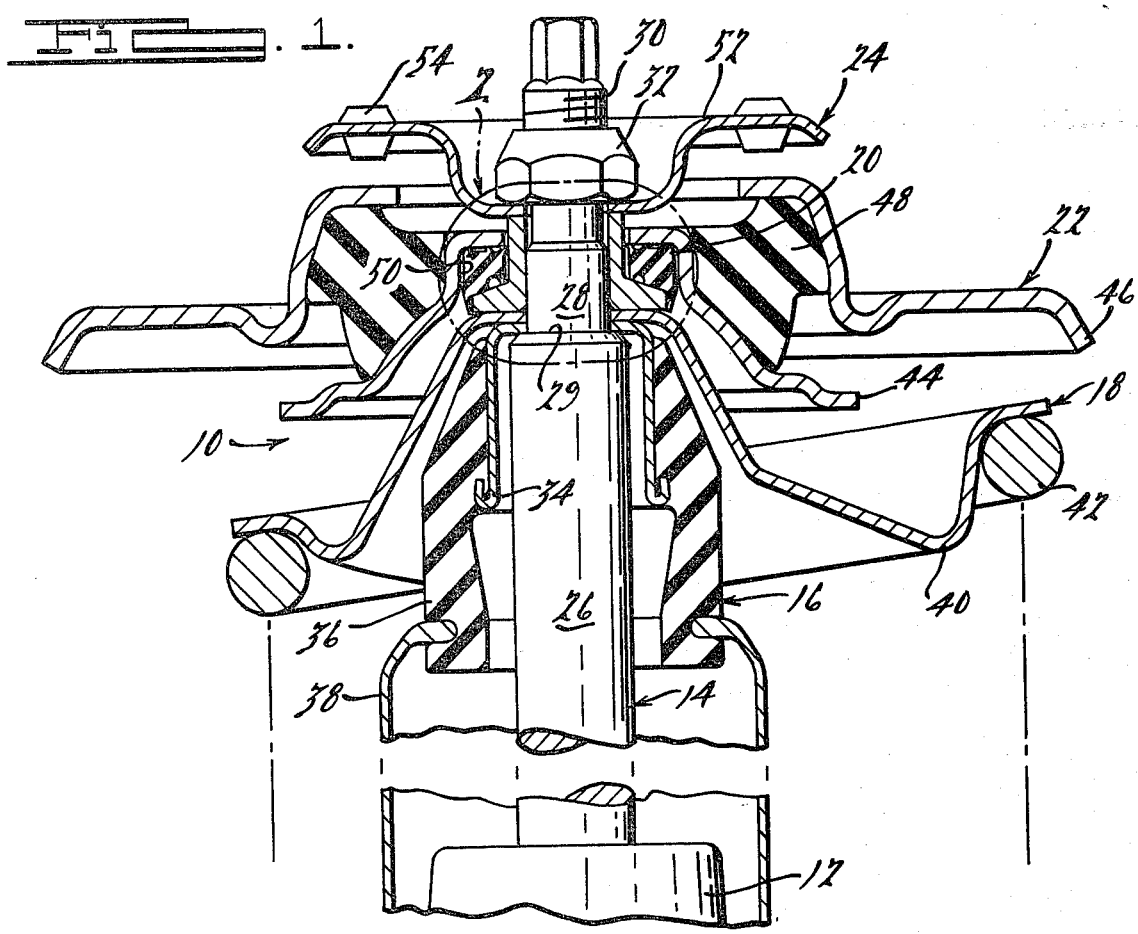
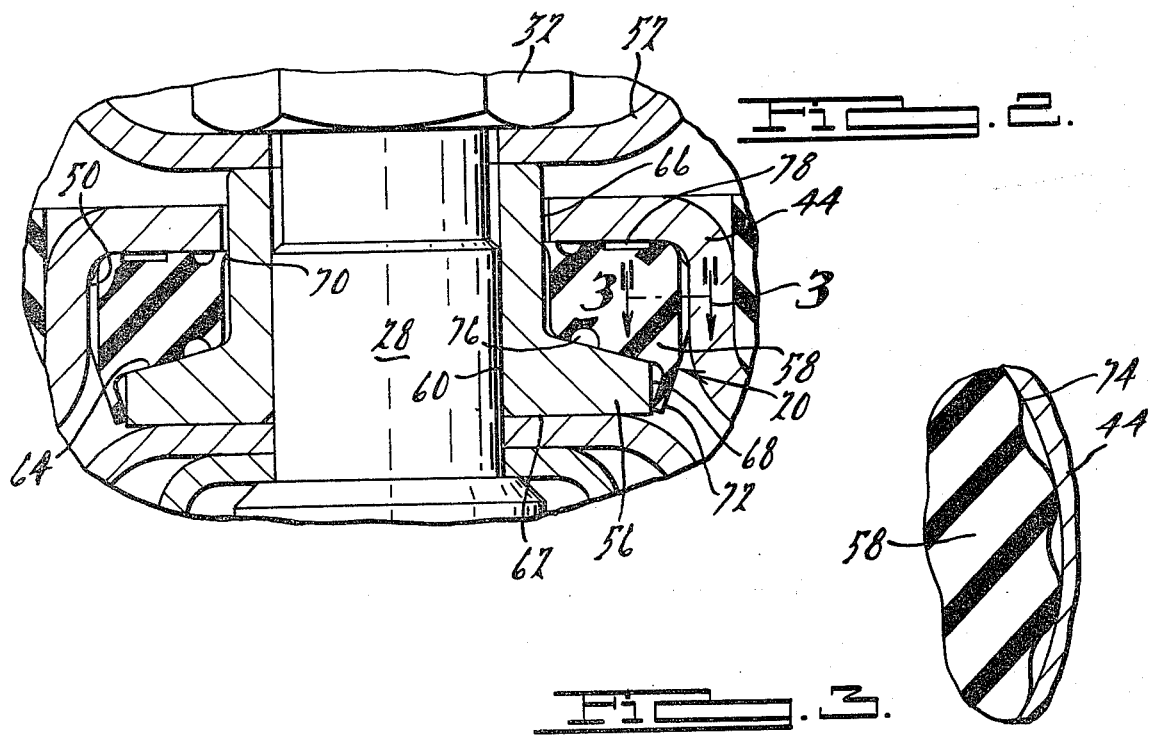

VEHICLE SUSPENSION STRUT

BACKGROUND OF THE INVENTION

1. Field of Invention

The present invention relates generally to vehicle suspension struts of the type employed in independent suspension systems and more particularly to bearing members employed in such struts.

2. Description of the Prior Art

The spring action modifying struts heretofore employed in independent front wheel vehicle suspension systems have used ball or roller bearings to absorb thrust and radial loads while permitting limited rotation for steering. While such use has generally been successful, certain problems have been identified in the use of these bearings in such an application.

One problem arises from the fact that the intermittent, limited rotation required of the bearing in permitting the wheel to which the strut is fixed to turn in the steering mode, substantially less than a full revolution, is not representative of the rotating duty for which ball or roller bearings are customarily designed and is more nearly representative of static loading conditions. Since the capacity of such bearings under static loading conditions is much less than under rotative conditions, larger bearings must be chosen to prevent brinelling of the bearing races, which can result in increased steering effort and ultimately in bearing failure.

Another problem identified is that the ball and roller bearings are relatively complex and expensive for use in the application described.

SUMMARY OF THE INVENTION

Responsive to the deficiencies in the prior art it is an object of the present invention to provide a vehicle suspension strut employing a simple economical bearing device.

It is another object to provide such a strut in which a unitary bushing member is used to carry thrust and radial loads.

BRIEF DESCRIPTION OF THE DRAWING

These and other objects will be apparent to those skilled in the art upon reading the following detailed description with reference to the accompanying drawing in which:

FIG. 1 is a partial cross sectional view of the suspension strut of the present invention;

FIG. 2 is an enlarged cross sectional view of the portion of FIG. 1 enclosed by the oval numbered 2; and FIG. 3 is a cross sectional view of the seal portion of the strut of the present invention taken along line 3—3 of FIG. 2.

DESCRIPTION OF THE PREFERRED EMBODIMENT

Turning now to the drawing, and in particular to FIG. 1, a vehicle suspension strut 10 is illustrated as comprising generally a cylinder member 12, a rod member 14, a jounce bumper assembly 16, a spring seat assembly 18, a bearing assembly 20, a resilient isolator assembly 22, and a rebound bumper assembly 24.

The strut 10 is preferably utilized in a Mac Pherson type independent front wheel suspension system in which it is interposed between a steerable vehicle wheel and a portion of the vehicle body. The cylinder member 12 is preferably fixed to support structure for the vehicle wheel in a known manner wherein it is moved rotatively as the wheel turns in steering. The rod member 14 is received in reciprocable relationship in the cylinder member 12 and is fixed to a portion of the vehicle body for damping relative motion between wheel and body in operation. The rod member 14 includes a main diameter portion 26 extending outwardly from the cylinder member 12, a bearing diameter portion 28, separated from the main diameter portion 26 by a shoulder 29 and extending outwardly therefrom, and a threaded portion 30. As can be seen from FIG. 1 a nut 32 is received on threaded portion 30 for axially retaining jounce bumper assembly 16, spring seat assembly 18, bearing assembly 20, resilient isolator assembly 22, and rebound bumper assembly 24 against rod member shoulder 29.

As illustrated in FIG. 1 the jounce bumper assembly 16 may be of the type disclosed in copending U.S. Application Ser. No. 3,319 of Pacis and Youngdale, assigned to the assignee of the present invention and consists of a stop member 34 surrounding the rod member 14 and abutting the shoulder 29, a cushion member 36 bonded to the stop member 34, and a dust shield 38 carried by the cushion member 36 and surrounding the end of the cylinder member 12.

The spring seat assembly 18 likewise surrounds the rod member 14 and cylinder member 12 and is illustrated as including in part an upper seat member 40 abutting the jounce bumper assembly stop member 34 and a coil spring 42. A lower seat member (not shown) is fixed to a lower portion of the cylinder member 12 for grounding the spring 42 at its lower end.

The resilient isolator assembly 22 is fixedly secured to the body of the vehicle in a known manner and is illustrated as including a lower, bearing receiving member 44, an upper attachment member 46 and a resilient isolator member 48 secured therebetween. As can be seen in FIG. 1 the lower and upper members 44,46 are not compressively engaged by the nut 32 and are shaped to provide a complementary nesting configuration for receiving the isolator member 48 between them and for receiving the bearing assembly 20 within a support diameter 50 formed within the lower member 44 in a minimum of axial space.

The rebound bumper assembly 24 is illustrated as being carried axially fast between the nut 32 and the bearing assembly 20. It consists of a rebound plate 52 carrying a rebound cushion 54 for engaging the top of upper isolator attachment member 46 during certain conditions of relative motion of vehicle wheel and body.

Turning now to FIGS. 2 and 3, the bearing assembly 20 of the present invention is illustrated in greater detail. In the preferred embodiment illustrated it includes a generally hat shaped bearing member 56 and a generally cylindrically shaped seal member 58. The bearing member may be successfully formed as a powered metal part as from iron and includes a finished central through bore 60 rotatively receiving the bearing portion 28 of the rod member 14 in a manner permitting the carrying of such loads. The bearing member 56 further includes an enlarged annular thrust contact surface 62 abuttingly engaging the top of upper spring seat 40 to transfer thrust loads. A tapered shoulder surface 64 defining an angle of about 78° with the longitudinal axis of the strut extends from an inner bearing diametral seal surface 66 to an outer bearing diametral sealing surface 68. These sealing surfaces 66,68 are engaged by lip portions 70,72, respectively formed on the elastomeric sealing member 58 to prevent contamination of the bearing 56; and the tapered shoulder 64 cooperates with the complementary lower surface of the seal member 58 to permit self centering of the bearing assembly 20 during eccentric loading conditions.

Corrugations 74 are preferably formed on the outer surface of the seal member 58 for permitting the maximization of the press fit employed in assembling the bearing assembly 20 in the receiving diameter 50 of the lower isolator member 44. Additional annular surface voids 76,78 in the seal member 58 may be used to enhance its flexibility and compliance in the illustrated installation.

While only one embodiment of the present invention has been described others may be possible without departing from the scope of the appended claims.

What is claimed is:

1. In a vehicle suspension strut of the type including a housing member connected to support means of a vehicle wheel, a rod member extending from the housing member and reciprocably moveable with respect thereto, and mounting means for resiliently connecting a portion of the rod member to the body of the vehicle including a bearing assembly carried on the rod member portion and received in a bearing pocket formed in the resilient mounting means, an improved bearing assembly comprising:
   A. a generally hat shaped metallic bearing member having;
      1. an inner diametral bearing surface engaging said rod member portion;
      2. first and second outer diametral sealing surfaces; and
      3. a frusto-conical shoulder surface extending between said first and second outer diametral sealing surfaces; and
   B. a generally cylindrical seal member having:
      1. an outer mounting diametral portion received in press fit relationship in said bearing pocket;
      2. first and second inner sealing portions sealingly engaging said first and second bearing member sealing surfaces; and
      3. a frusto-conical surface complementary to and abuttingly engaging said bearing member shoulder surface whereby upon imposition of eccentrically directed loads on said rod member self centering of said improved bearing assembly with respect to said vehicle suspension strut is effected.

2. An improved bearing assembly as defined in claim 1 wherein said bearing frusto-conical shoulder surface and said frusto-conical seal surface define an angle of approximately 78° with the longitudinal axis of said rod.

3. An improved bearing assembly as defined in claims 1 or 2 wherein said seal member outer diametral portion is formed to define a corrugated surface whereby the amount of press fit employed in inserting said improved bearing assembly into said bearing pocket is increased.

4. An improved bearing assembly as defined in claims 1, 2, or 3 wherein said seal member first and second sealing portions comprise highly flexible lip members abuttingly engaging said bearing member sealing surfaces with substantially line contact.

5. In a vehicle suspension strut of the type including a housing member connected to support means of a vehicle wheel, a rod member extending from the housing member and reciprocably moveable with respect thereto, and mounting means for resiliently connecting a portion of the rod member to the body of the vehicle including a bearing assembly carried on the rod member portion and received in a bearing pocket formed in the resilient mounting means, an improved bearing assembly comprising:
   A. a generally hat shaped metallic bearing member having:
      1. an inner diametral bearing surface engaging said rod member portion;
      2. first and second outer diametral sealing surfaces; and
      3. a frusto-conical shoulder surface extending between said first and second outer diametral sealing surfaces; and
   B. a generally cylindrical seal member having:
      1. an outer mounting diametral portion received in press fit relationship in said bearing pocket;
      2. means for sealingly engaging said bearing member; and
      3. a frusto-conical surface complementary to and abuttingly engaging said bearing member shoulder surface whereby upon imposition of eccentrically directed loads on said rod member self centering of said improved bearing assembly with respect to said vehicle suspension strut is effected.

* * * * *